United States Patent [19]
Kinzel

[11] Patent Number: 5,538,216
[45] Date of Patent: Jul. 23, 1996

[54] SUPPORT DEVICE OF A LAYING VEHICLE, ESPECIALLY OF A TRACK-LAYING VEHICLE

[75] Inventor: Walter Kinzel, Mainz, Germany

[73] Assignee: Man Gutehoffnungshütte, Oberhausen, Germany

[21] Appl. No.: 219,958

[22] Filed: Mar. 30, 1994

[51] Int. Cl.⁶ .................................................. B60S 9/00
[52] U.S. Cl. .......................... 248/654; 248/595; 248/647; 248/669; 280/764.1
[58] Field of Search ........................ 248/284, 351, 248/593, 595, 653, 654, 647, 660, 664, 666, 669; 280/764.1, 766.1; 212/189; 171/116; 172/397; 14/2.4

[56] References Cited

U.S. PATENT DOCUMENTS

| | | | |
|---|---|---|---|
| 2,880,528 | 4/1959 | Lusk | 37/169 |
| 3,492,683 | 2/1970 | Wagner et al. | 14/1 |
| 3,630,544 | 12/1971 | Grishman | 280/764.1 |
| 3,897,079 | 7/1975 | MacKenzie et al. | 280/764.1 |
| 3,901,329 | 8/1975 | Eftefield | 172/804 |
| 3,941,195 | 3/1976 | Stedman | 172/801 |
| 3,989,149 | 11/1976 | Smith et al. | 214/138 |
| 4,116,467 | 9/1978 | Ewert | 280/764.1 |
| 4,236,643 | 12/1980 | Schmitz | 280/764.1 |
| 4,244,599 | 1/1981 | Gauchet | 280/764.1 |
| 4,286,803 | 9/1981 | Schulz | 280/764.1 |
| 4,288,196 | 9/1981 | Sutton, II | 280/764.1 |
| 4,417,644 | 11/1983 | Brogard | 280/764.1 |
| 4,569,422 | 2/1986 | Hoffman | 280/764.1 |
| 4,664,203 | 5/1987 | Williams | 172/826 |
| 4,966,240 | 10/1990 | Aikawa | 172/825 |
| 5,067,191 | 11/1991 | Kinzel et al. | 14/2.4 |

FOREIGN PATENT DOCUMENTS

| | | | |
|---|---|---|---|
| 2678297 | 12/1992 | France | 14/2.4 |
| 1658604 | 1/1972 | Germany | |
| 2908380 | 9/1980 | Germany | 14/2.4 |
| 3891429 | 5/1992 | Germany | 14/2.4 |
| 482870 | 1/1970 | Sweden | 354/14 |

*Primary Examiner*—Karen J. Chotkowski
*Assistant Examiner*—Anita M. King
*Attorney, Agent, or Firm*—McGlew and Tuttle

[57] ABSTRACT

A support device of a laying vehicle such as a track laying vehicle includes a vehicle pan providing a support surface, the support surface having a central plane, a support shield for engaging the ground, a first guide element hingedly connected between the support shield and the vehicle pan, a first bearing connecting the first guide element to the support shield, a second guide element hingedly connected between the support shield and the vehicle pan, a second bearing connecting the second guide element to the support shield, a first piston-and-cylinder unit connected between the support shield and the vehicle pan, a first piston-and-cylinder unit bearing connecting the first piston-and-cylinder unit to the support shield, a second piston-and-cylinder unit connected between the support shield and the vehicle pan, a second piston-and-cylinder unit bearing connecting the second piston-and-cylinder unit to the support shield, the first bearing, the second bearing, the first piston-and-cylinder unit bearing and the second piston-and-cylinder unit bearing having a common support shield bearing axis. A side force transmission arrangement is provided for transmitting side forces from the support shield to the vehicle pan. The side force transmission arrangement preferably includes at least one spherical hinge connection arranged on the support shield centrally with respect to the vehicle central plane and an additional guide element with a side force transmission member. The additional guide element is connected to the spherical hinge connection, the spherical hinge connection being located in the support shield bearing axis.

20 Claims, 5 Drawing Sheets

SUPPORT DEVICE OF A LAYING VEHICLE, ESPECIALLY OF A TRACK-LAYING VEHICLE

FIELD OF THE INVENTION

The present invention pertains to a support device of a laying vehicle, especially of a track-laying vehicle with support shields for engaging the ground in the vicinity of the region the track is to be laid down.

BACKGROUND OF THE INVENTION

Various support devices for laying vehicles have been known.

A support device, which consists of a support shield with guide elements, has been known from DE 38,91,429. The piston-and-cylinder units are arranged inside the vehicle at the extensions of the guide elements connected in a hinge-like manner.

DE 16,58,604 shows a support device consisting of a support shield, guide elements and piston-and-cylinder units.

The disadvantage of these connections of the support shields to the vehicle pan structure is the fact that horizontal alignment of the vehicle to achieve an ideal laying position during mechanical laying is not possible when the ground is included relative to the longitudinal axis of the vehicle.

Due to the oblique position, strong forces usually occur in the guides of the laying mechanism, which are deleterious for the laying process.

SUMMARY AND OBJECTS OF THE INVENTION

It is an object of the present invention therefore to provide a support structure, in which it is possible to improve the support structure between the vehicle pan and the support shield such that the horizontal side forces that occur between the transversely sloped support shield and the horizontally aligned laying vehicle pan are transmitted in a specific and optimal manner.

This is accomplished according to the present invention by providing the support shield with at least two guide elements and two piston-and-cylinder units either with two degrees of freedom each due to the use of spherical bearings as well as an additional guide element, designed preferably as a steering triangle, which is connected to the vehicle pan in a hinged manner and is mounted slidingly in the plane of symmetry of the vehicle and spherically in the support shield axis, or with two degrees of freedom for the two piston-and-cylinder units only, and the two guide elements with pivoting bearings are fastened to the vehicle pan and are connected to the support shield with spherical slide bearings.

The mounting of the piston-and-cylinder unit is also located in the support shield bearing axis and the mounting of the two guide elements, as well as the additional guide element are located on the same axis in the fastening of the vehicle pan. These features are central to the invention.

According to an advantageous embodiment of the present invention, the additional guide element absorbs and transmits all horizontal side forces from the transversely sloped position of the support shield.

No bending forces appear due to the spherical mounting, as a result of which the susceptibility to malfunction is eliminated.

In order not to adversely affect the angle of slope as well as the ground clearance on the front side of the track-laying vehicle, it is necessary to keep the component height of the guide elements very low. The additional guide element is slidingly mounted in the spherical hinge connection of the support shield, and the bearings of the guide elements and the bearings of the piston-and-cylinder units are of a spherical design.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
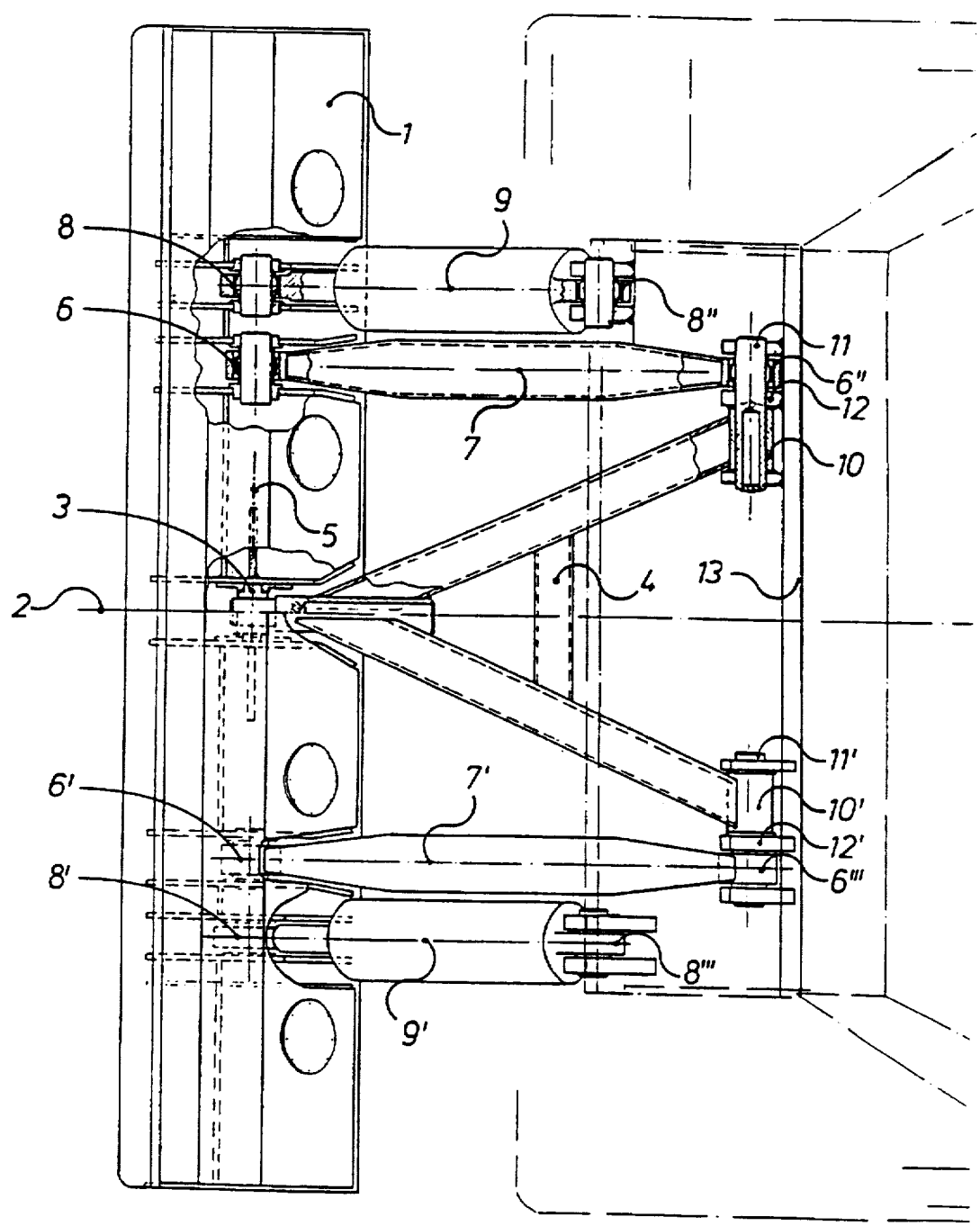
FIG. 1 is a top view of a support device with additional guide element.

Referring to the drawings in particular the invention comprises a support device formed with the side force transmission means. In the embodiment of FIG. 1, the side force or horizontal side force transmission means includes a spherical hinge connection 3, in which an additional guide element 4, designed preferably as a steering triangle, with side force transmission members, is slidingly mounted. The spherical hinge connection 3 is arranged in the center of the support shield 1 in the plane of symmetry 2 of the vehicle.

The spherical hinge connection 3 is a spherical slide bearing in a support shield bearing axis (the support shield axis 5), as are the bearings 6, 6' of the guide elements 7, 7' and the bearings 8, 8' of the piston-and-cylinder units 9, 9'.

The pivoting bearings 10, 10' of the additional guide elements 4 are fastened to the axes 11, 11' of the guide elements 7, 7' at the vehicle pan 13.

The guide elements 7, 7' and the piston-and-cylinder units 9, 9' have two degrees of freedom due to the use of spherical bearings 6, 6', 6", 6'" and 8, 8', 8", 8'". The guide elements are connected at the vehicle pan by a vehicle pan fastening support 12, 12'.

Figure 2:
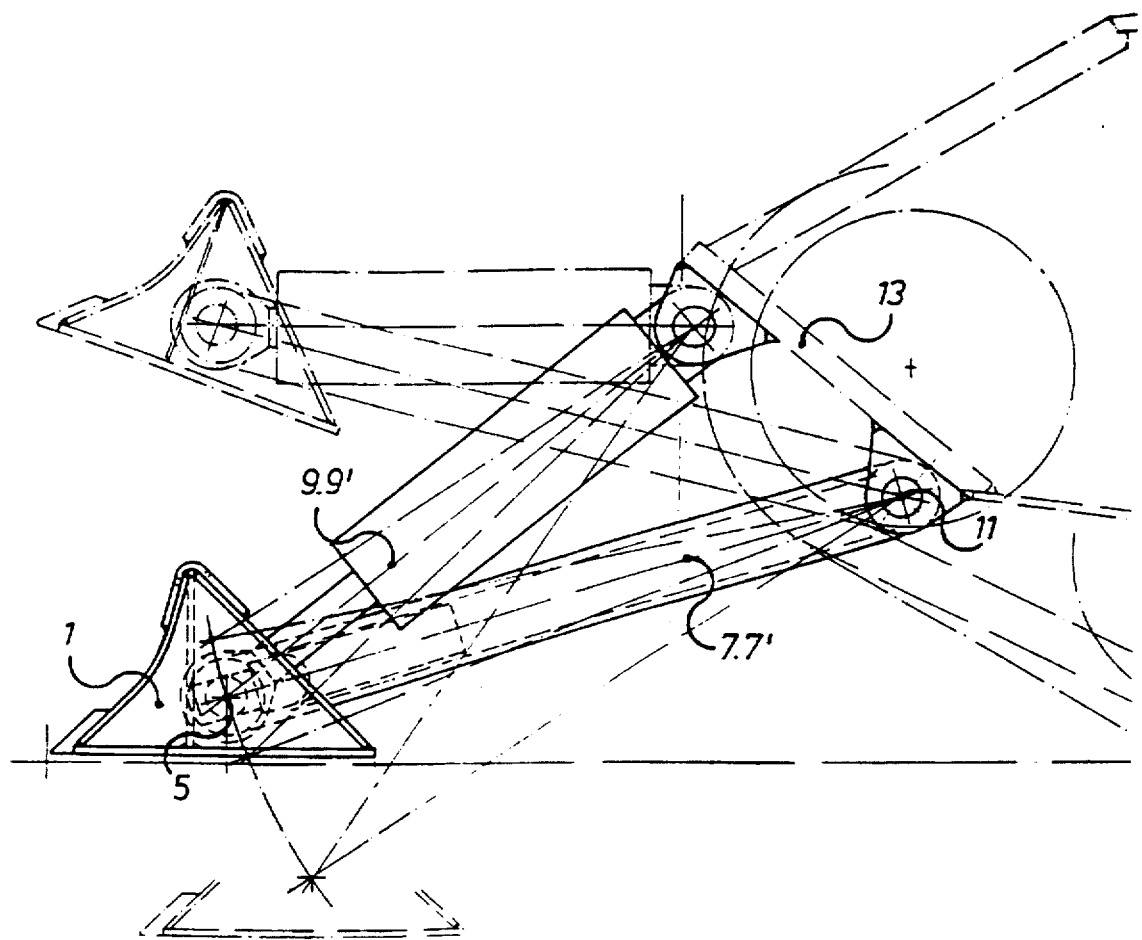
FIG. 2 is a side view of a support device with additional guide element.

As can be recognized from FIG. 2, the guide elements 7, 7' and the piston-and-cylinder units 9, 9' form a triangle with the vehicle pan 13, and the support shield 1 suspended in the support shield axis 5 is thus able to assume defined positions.

Figure 3:
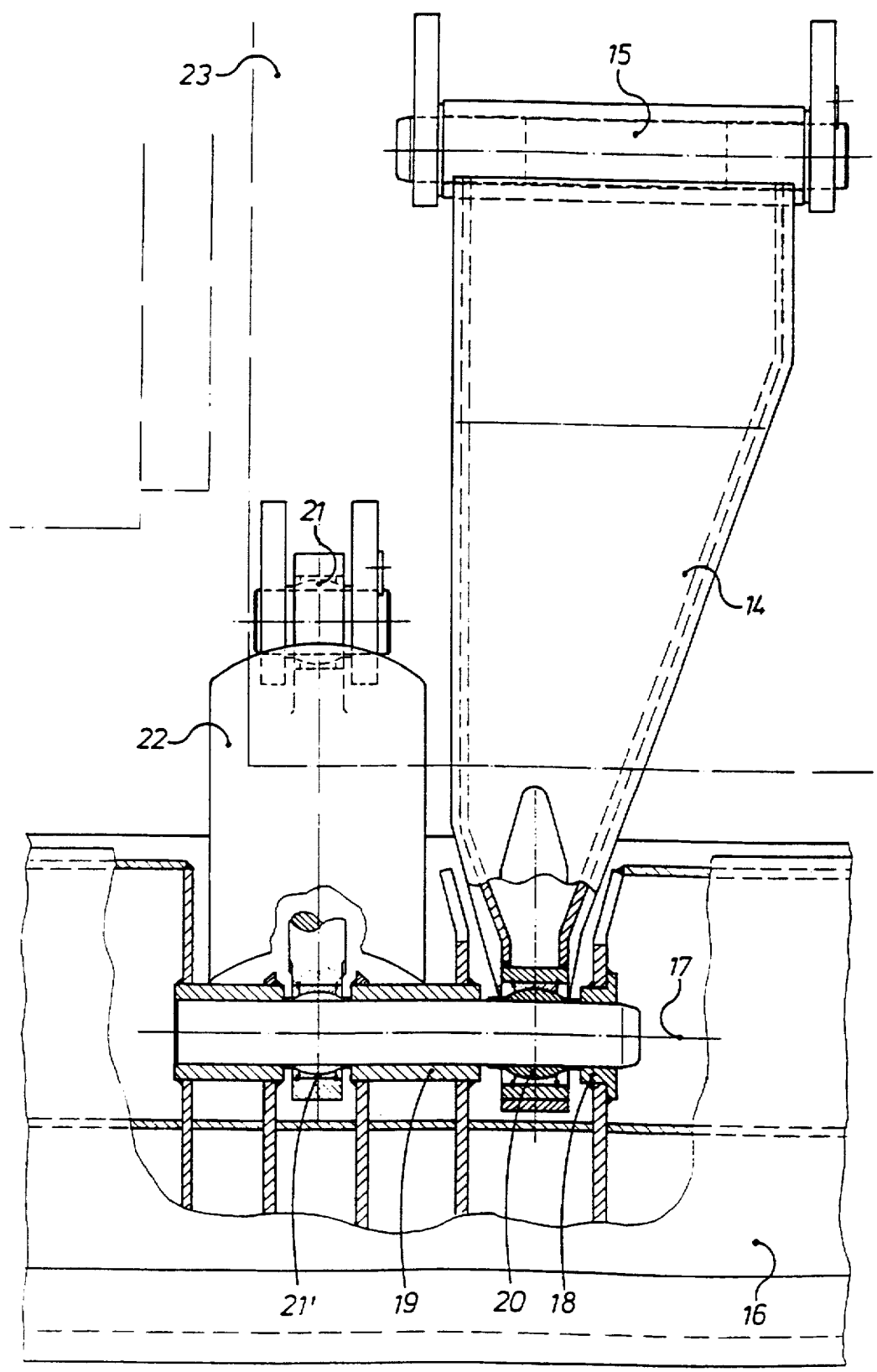
FIG. 3 is a partial view of a support device according to another embodiment of the invention with the piston-and-cylinder unit withdrawn.

FIG. 3 shows another embodiment of the invention wherein a support device is formed with the side force transmission means provided as part of two guide elements 14, 14'. A partial view of this support device is shown in FIG. 3. This view shows the piston-and-cylinder unit 22, 22' withdrawn, with spherical bearing 21, 21', and the guide element 14, with the pivoting bearing 15, at the vehicle pan 23, and the spherical slide bearing 20, is—in the horizontal position—at the inner stop 18, on the longitudinal axis 17 of the support shield 16. The pivot bearing being a length which is larger than a length of the spherical slide bearing.

Figure 4:
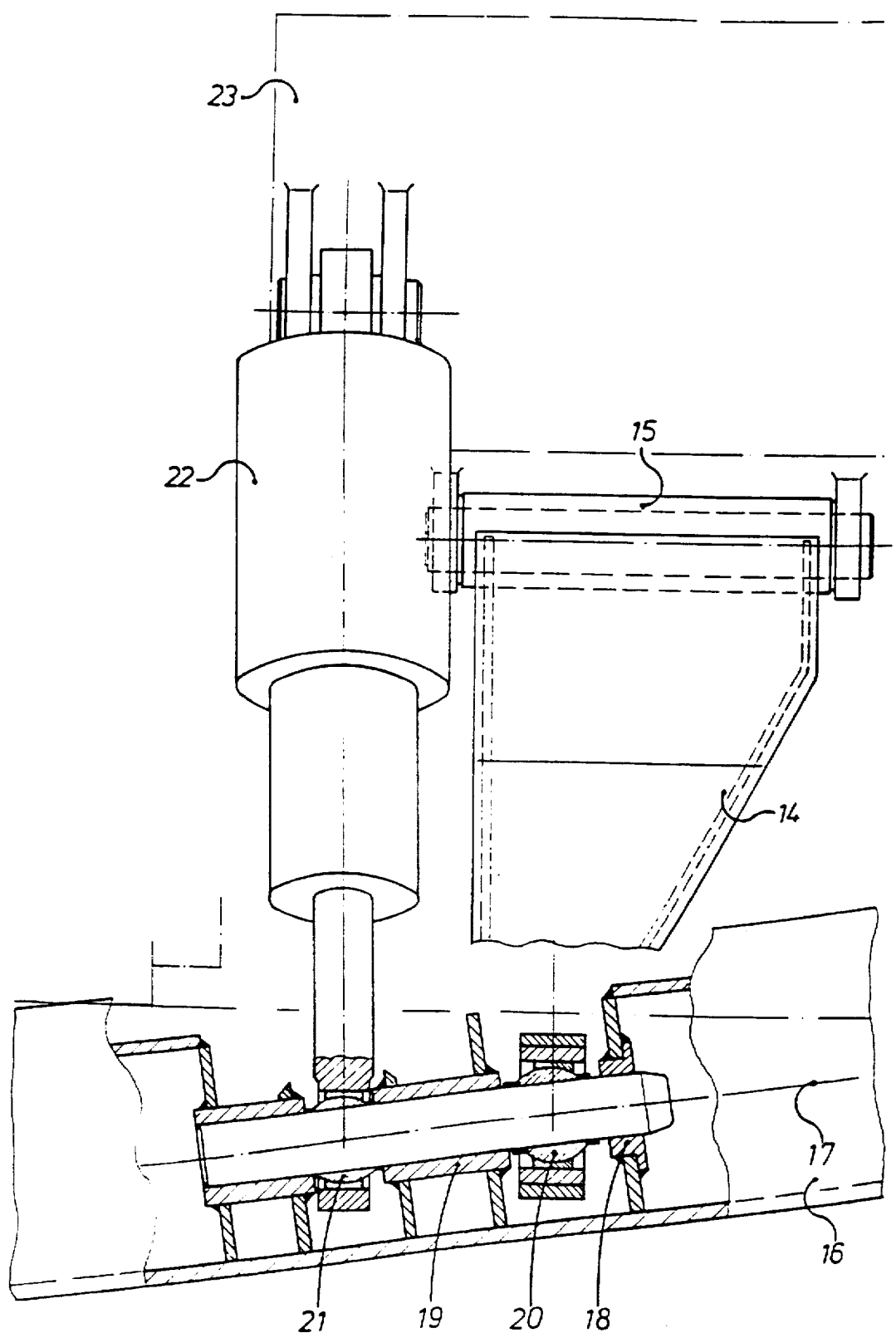
FIG. 4 is a partial view of a support device of FIG. 3, with the piston-and-cylinder unit extended.

FIG. 4 shows a partial view of a support device with the piston-and-cylinder unit 22, 22' and the support shield 16 extended obliquely.

The support shield 16 has migrated on the support shield longitudinal axis 17 in the spherical slide bearing 20, of the guide elements 14, 14' up to the outer stop 19.

Figure 5:
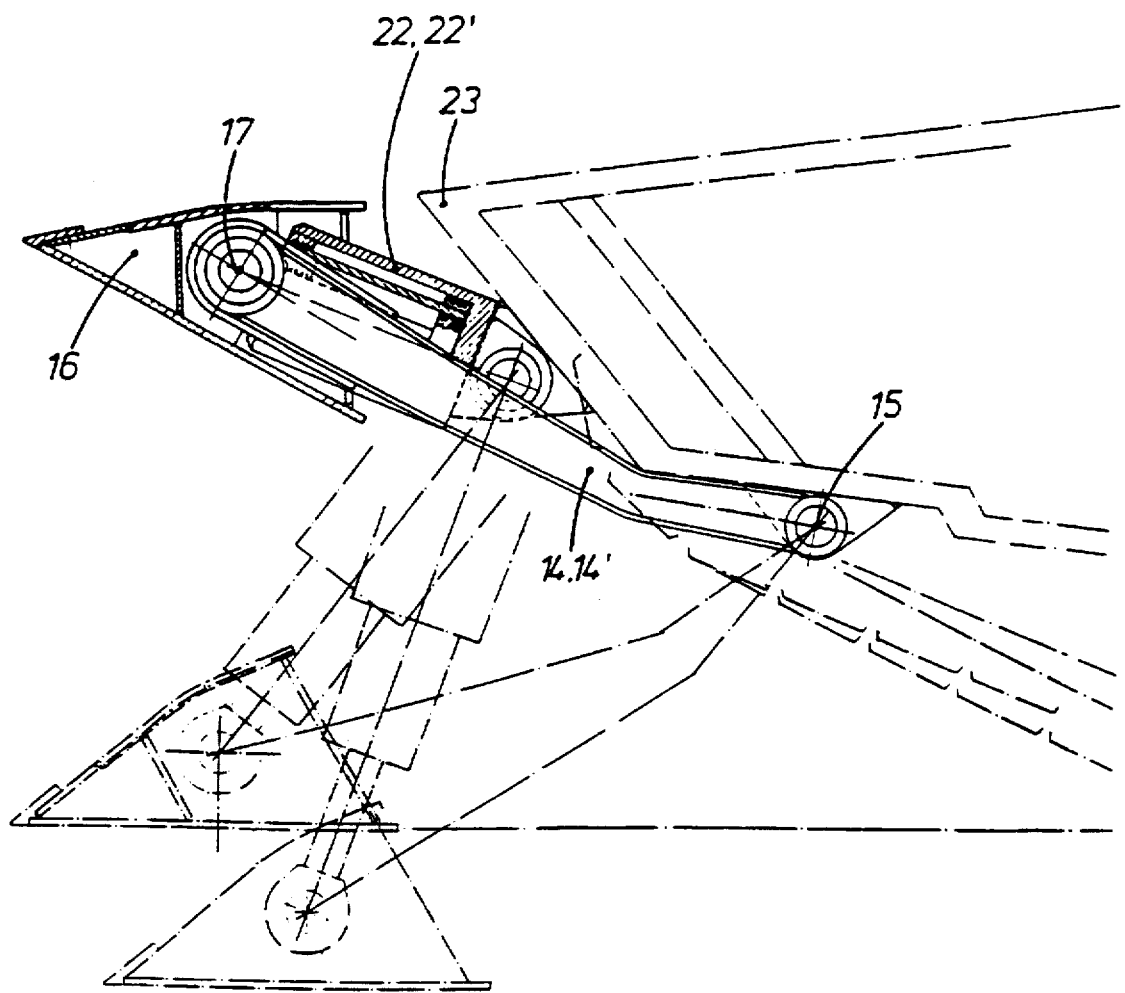
FIG. 5 is a side partially sectional view of a support device of FIG. 3 without impairment of ground clearance.

FIG. 5 shows a side view of the support device without any impairment as to ground clearance. Specifically, the side force transmission means is provided wherein the guide elements 14, 14' are formed angled allowing the guide elements 14, 14' to be connected at the vehicle pan so as to pivot about pivot bearing 15. The support shield 16 is shown moved to various different positions (in Phantom) as it moves with respect to the longitudinal axis 17. The various positions of the piston-and-cylinder unit 22, 23 are shown with respect to its pivoting relative to the vehicle pan 23.

While a specific embodiment of the invention has been shown and described in detail to illustrate the application of the principles of the invention, it will be understood that the invention may be embodied otherwise without departing from such principles.

What is claimed is:

1. Support device of a laying vehicle, comprising:
   a vehicle pan providing a support surface, the support surface having a central plane; a support shield for engaging the ground;
   a first guide element hingedly connected between said support shield and said vehicle pan;
   a first bearing connecting said first guide element to said support shield;
   a second guide element hingedly connected between said support shield and said vehicle pan;
   a second bearing connecting said second guide element to said support shield;
   a first piston-and-cylinder unit connected between said support shield and said vehicle pan;
   a first piston-and-cylinder unit bearing connecting said first piston-and-cylinder unit to said support shield;
   a second piston-and-cylinder unit connected between said support shield and said vehicle pan;
   a second piston-and-cylinder unit bearing connecting said second piston-and-cylinder unit to said support shield, said first bearing, said second bearing, said first piston-and-cylinder unit bearing and said second piston-and-cylinder unit bearing having a common support shield bearing axis; and
   side force transmission means for transmitting side forces from said support shield to said vehicle pan.

2. A support device according to claim 1, wherein said side force transmission means comprises:
   at least one spherical hinge connection arranged on said support shield centrally with respect to said vehicle central plane; and
   an additional guide element with a side force transmission member, said additional guide element being connected to said spherical hinge connection, said spherical hinge connection being located in said support shield bearing axis.

3. A support device according to claim 1, wherein said side force transmission means comprises:
   members for transmitting side forces from said first guide element and said second guide element, each of said first guide element and said second guide element being connected to said vehicle pan with a pivoting bearing; and a spherical slide bearing forming said first bearing and a spherical slide bearing forming said second bearing, each of said spherical slide bearings being positioned between two stops, in a vicinity of said piston-and-cylinder bearing, said pivoting bearings having a length which is larger than a length of said spherical slide bearings.

4. A support device according to claim 2, wherein said additional guide element is connected to said vehicle pan by two pivoting bearings, said pivoting bearings being located on a guide bearing axis in a vehicle pan fastening support.

5. A support device according to claim 2, wherein said additional guide element is designed as a steering triangle.

6. A support device according to claim 2, wherein said additional guide element is slidingly mounted in said spherical hinge connection of said support shield, said bearings of said guide elements and said bearings of said piston-and-cylinder units being of a spherical design.

7. A support device according to claim 1, wherein:
   said first and second bearings are spherical bearings.

8. A support device according to claim 1, wherein:
   said first and second piston-and-cylinder unit bearings are spherical bearings.

9. A support device according to claim 7, wherein:
   a third bearing connects said first guide element to said vehicle pan;
   a fourth bearing connects said second guide element to said vehicle pan.

10. A support device according to claim 9, wherein:
    said third and fourth bearings are spherical bearings.

11. A support device according to claim 8, wherein:
    a third piston-and-cylinder unit bearing connects said first piston-and-cylinder unit to said vehicle pan;
    a fourth piston-and-cylinder unit bearing connects said second piston-and-cylinder unit to said vehicle pan.

12. A support device according to claim 11, wherein:
    said third and fourth piston-and-cylinder unit bearings are spherical bearings.

13. A support device according to claim 1, wherein:
    said first and second bearings are slide bearings.

14. A support device according to claim 1, wherein:
    said first and second piston-and-cylinder unit bearings are slide bearings.

15. A support device according to claim 1, wherein:
    said first and second bearings are spherical slide bearings;
    said first and second piston-and-cylinder unit bearings are spherical slide bearings;
    a third bearing connects said first guide element to said vehicle pan, said third bearing is a spherical bearing;
    a fourth bearing connects said second guide element to said vehicle pan, said fourth bearing is a spherical bearing;
    a third piston-and-cylinder unit bearing connects said first piston-and-cylinder unit to said vehicle pan, said third piston-and-cylinder unit bearing is a spherical bearing;
    a fourth piston-and-cylinder unit bearing connects said second piston-and-cylinder unit to said vehicle pan, said fourth piston-and-cylinder unit bearing is a spherical bearing.

16. A support device according to claim 1, wherein:

said first and second bearings are spherical slide bearings;

said first and second piston-and-cylinder unit bearings are spherical slide bearings;

a third bearing connects said first guide element to said vehicle pan;

a fourth bearing connects said second guide element to said vehicle pan;

a third piston-and-cylinder unit bearing connects said first piston-and-cylinder unit to said vehicle pan, said third piston-and-cylinder unit bearing is a spherical bearing;

a fourth piston-and-cylinder unit bearing connects said second piston-and-cylinder unit to said vehicle pan, said fourth piston-and-cylinder unit bearing is a spherical bearing.

17. A support device according to claim 1, wherein:

said side force transmission means blocks movement of said support shield toward said vehicle pan.

18. A support device according to claim 1, wherein:

said side force transmission means includes a member spherically connected to said support shield and only pivotally connected to said vehicle pan.

19. Support device of a laying vehicle, comprising:

a vehicle pan providing a support surface, the support surface having a central plane; a support shield for engaging the ground;

a first guide element hingedly connected between said support shield and said vehicle pan;

a first bearing connecting said first guide element to said support shield;

a second guide element hingedly connected between said support shield and said vehicle pan;

a second bearing connecting said second guide element to said support shield;

a first piston-and-cylinder unit connected between said support shield and said vehicle pan;

a first piston-and-cylinder unit bearing connecting said first piston-and-cylinder unit to said support shield;

a second piston-and-cylinder unit connected between said support shield and said vehicle pan;

a second piston-and-cylinder unit bearing connecting said second piston-and-cylinder unit to said support shield, said first bearing, said second bearing, said first piston-and-cylinder unit bearing and said second piston-and-cylinder unit bearing having a common support shield bearing axis, a spherical slide bearing forming said first bearing and a spherical slide bearing forming said second bearing; and side force transmission means for transmitting side forces from said support shield to said vehicle pan including at least one spherical hinge connection arranged on said support shield centrally with respect to said vehicle central plane, and an additional guide element with a side force transmission member, said additional guide element being connected to said spherical hinge connection, said spherical hinge connection being located in said support shield bearing axis.

20. Support device of a laying vehicle, comprising:

a vehicle pan providing a support surface, the support surface having a central plane;

a support shield for engaging the ground;

a first guide element hingedly connected between said support shield and said vehicle pan;

a first bearing connecting said first guide element to said support shield;

a second guide element hingedly connected between said support shield and said vehicle pan;

a second bearing connecting said second guide element to said support shield;

a first piston-and-cylinder unit connected between said support shield and said vehicle pan;

a first piston-and-cylinder unit bearing connecting said first piston-and-cylinder unit to said support shield;

a second piston-and-cylinder unit connected between said support shield and said vehicle pan;

a second piston-and-cylinder unit bearing connecting said second piston-and-cylinder unit to said support shield, said first bearing, said second bearing, said first piston-and-cylinder unit bearing and said second piston-and-cylinder unit bearing having a common support shield bearing axis; and side force transmission means for transmitting side forces from said support shield to said vehicle pan, said side force transmission means includes members for transmitting side forces, said members being formed with said first guide element and said second guide element, each of said first guide element and said second guide element being connected to said vehicle pan with a pivoting bearing; and a spherical slide bearing forming said first bearing and a spherical slide bearing forming said second bearing, each of said spherical slide bearings being positioned between two stops, in a vicinity of said piston-and-cylinder bearing, said pivoting bearings having a length which is larger than a length of said spherical slide bearings.

* * * * *